United States Patent

Shiraishi et al.

[11] Patent Number: 5,991,872
[45] Date of Patent: Nov. 23, 1999

[54] PROCESSOR

[75] Inventors: Mikio Shiraishi, Yokohama; Masaki Saitou, Sagamihara; Yuji Okuda, Tokyo, all of Japan

[73] Assignee: Kabushiki Kaisha Toshiba, Kawasaki, Japan

[21] Appl. No.: 08/947,750

[22] Filed: Oct. 9, 1997

[30] Foreign Application Priority Data

Nov. 28, 1996 [JP] Japan .................................. 8-317803

[51] Int. Cl.[6] .................................................. G06F 13/00
[52] U.S. Cl. ..................... 712/237; 712/237; 712/235; 712/236; 712/234
[58] Field of Search ....................... 364/736.01, 736.02, 364/736.05; 395/392, 562, 584, 580, 582, 583, 581; 712/237, 233, 235, 236, 234

[56] References Cited

U.S. PATENT DOCUMENTS

| | | | |
|---|---|---|---|
| 4,310,881 | 1/1982 | Eldumiati | 710/28 |
| 5,077,663 | 12/1991 | Kanazawa | 395/775 |
| 5,185,869 | 2/1993 | Suzuki | 395/376 |
| 5,201,057 | 4/1993 | Uht | 395/800 |
| 5,469,551 | 11/1995 | Sites et al. | 395/376 |
| 5,537,560 | 7/1996 | Boggs et al. | 395/376 |

FOREIGN PATENT DOCUMENTS

64-58039  3/1989  Japan .

*Primary Examiner*—Zarni Maung
*Assistant Examiner*—Saleh Najjar
*Attorney, Agent, or Firm*—Banner & Witcoff, Ltd.

[57] ABSTRACT

Microprocessors use a conditional branch instruction so as to change processing in accordance with conditions. According to the prior art, a NOP instruction, which causes no operation, is used when a condition is satisfied, and the use of the NOP instruction inevitably lengthens the processing time. According to the present invention, a conditional transfer instruction is included in the instruction set of a microprocessor, and a flag decoder is additionally employed. The flag decoder determines whether a condition is satisfied or not, and outputs a control signal on the basis of the determination. The control signal is supplied to the instruction decoder of the processor to make a data transfer operation effective or ineffective. Accordingly, it is not necessary to use a NOP instruction, and the processing time can be as short as possible.

13 Claims, 7 Drawing Sheets

PROCESSOR

BACKGROUND OF THE INVENTION

The present invention relates to a processor, such as a microprocessor or a signal processor, and more particularly to a technique the processor uses for executing data transfer instructions.

Figure 11:
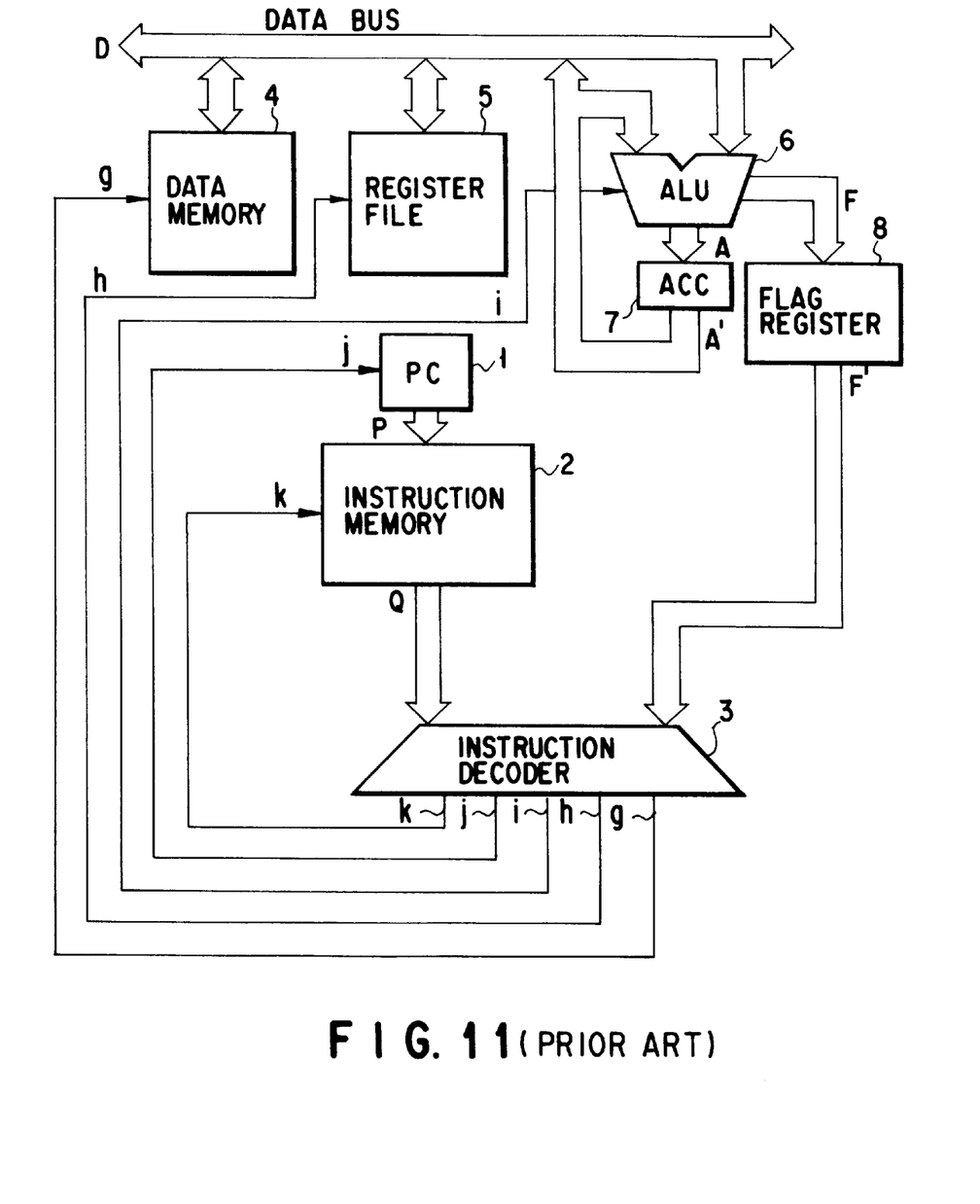
FIG. 11 shows a prior art microprocessor.

FIG. 11 shows an example of a prior art microprocessor.

The microprocessor shown in FIG. 11 comprises a program counter 1, an instruction memory 2, an instruction decoder 3, a data memory 4, a register file 5, an operation circuit 6, an accumulator 7, and a flag register 8.

The program counter 1 outputs an address signal P.

This address signal P is supplied to the address signal input terminal of the instruction memory 2. In response to this, an instruction Q stored at the address area corresponding to the address signal P is read out from the instruction memory 2 and is written in an instruction register IR (not shown).

The instruction Q stored in the instruction register IR is supplied to the instruction input terminal of the instruction decoder 3. Upon receipt of the instruction Q, the instruction decoder 3 analyzes it and generates signals corresponding thereto. To be more specific, control signals g, h, i, j and k are generated, and supplied to the data memory 4, register file 5, operation circuit 6, program counter 1 and instruction memory 2, respectively.

The data input/output terminals of the data memory 4, register file 5 and operation circuit 6 are connected to a data bus. By way of this data bus, data D is exchanged among the data memory 4, register file 5 and operation circuit 6.

The operation circuit 6 executes an arithmetic operation in response to data A' stored in the accumulator 7 and data D supplied thereto from the data bus. Data A, which is the result of the arithmetic operation performed by the operation circuit 6, is stored in the accumulator 7. The conditions generated during the operation, such as the overflow condition, the plus or minus state of an arithmetic operation result, the "zero" state thereof, a carry output, are represented by respective flags (1-bit signals). The operation circuit 6 arranges these flags in the form of one flag signal F and outputs this flag signal F.

The flag signal F is stored in the flag register 8. Output signal F' from the flag register 8 is supplied to the flag input terminal of the instruction decoder 3 as an operation flag signal.

The instruction decoder 3 uses the operation flag signal F' for determining the branch conditions of a conditional branch instruction. The conditional branch instruction is used for controlling instruction execution procedures.

An example of an operation flag signal F' to which the above condition signals are assigned will be described.

third bit F3' . . . overflow flag V which is "1" at the time of overflow and is "0" in the other situations second bit F2' . . . sign flag S which is "1" when the result is minus and is "0" in the other situations first bit F1' . . . zero flag Z which is "1" when the digits of the result are all zero and is "0" in the other situations zero bit F0' . . . carry flag Z which is "1" when the uppermost digit must be carried and is "0" in the other situations In order to control the instruction execution procedures in accordance with the flags, conditional branch instructions set forth below are prepared and included in a set of instructions of the processor.

JUMPV LABEL1: if F3'="1", go to address LABEL1
JUMPS LABEL1: if F2'="1", go to address LABEL1
JUMPZ LABEL1: if F1'="1", go to address LABEL1
JUMPC LABEL1: if F0'="1", go to address LABEL1

In general, there may be a case where transfer has to be executed in accordance with the result of an operation. However, the conventional processor cannot use a flag in operations which do not include a carry input or in instructions which are other than branch instructions. Therefore, in order to perform transfer in accordance with the result of an operation, both a transfer instruction and a conditional branch instruction have to be executed. Therefore, even if the processor is so designed as to execute data transfer within one machine cycle, which is a minimum instruction execution time, a task involving data transfer to be executed in accordance with the result of an operation inevitably requires a long time. The time required to complete such a task is twice as long as the time needed to fulfill a task including ordinary data transfer (i.e., unconditional data transfer).

Figure 12:
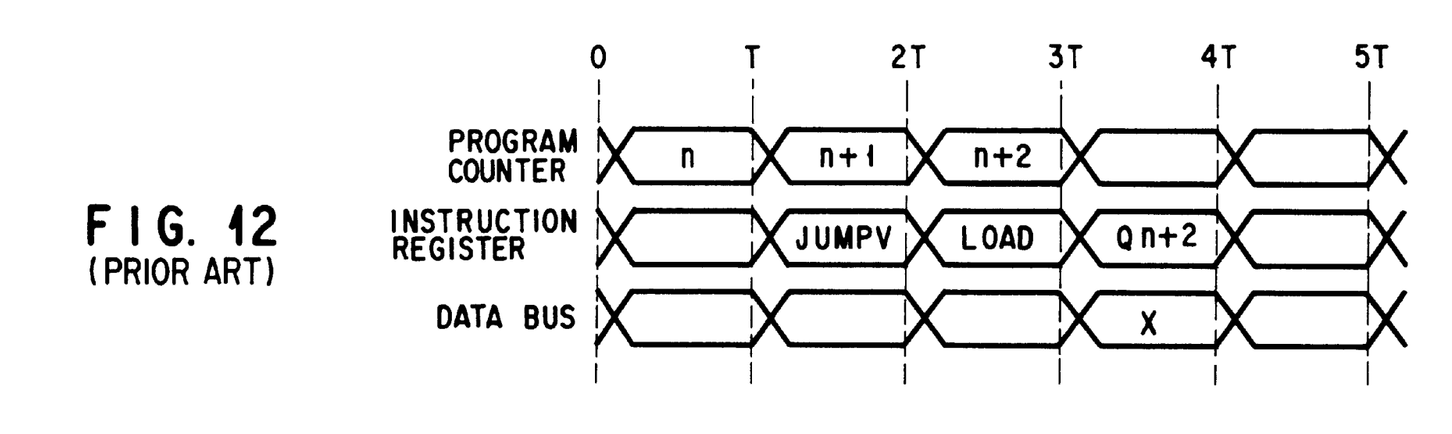
FIG. 12 is a timing chart of the prior art microprocessor shown in FIG. 11.
Figure 13:
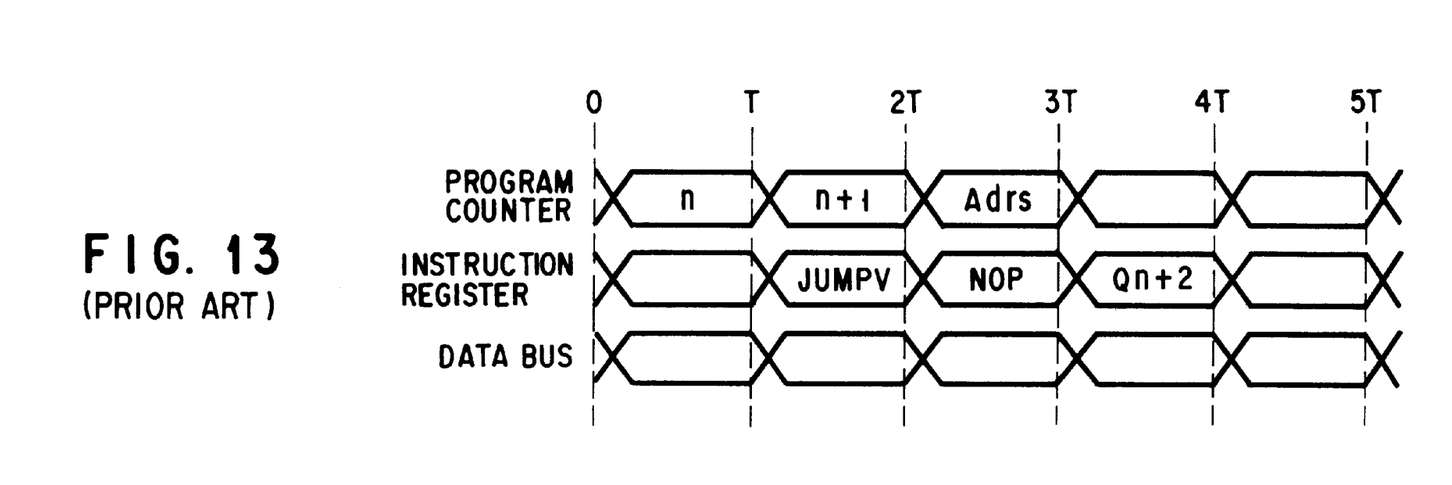
FIG. 13 is also a timing chart of the prior art microprocessor shown in FIG. 11.

FIGS. 12 and 13 are timing charts showing cases where a conditional branch instruction and a data transfer instruction are executed in combination. In the timing charts, the address signal P output from the program counter 1, the instruction Q stored in the instruction register IR and the data D at the data bus are plotted in relation to time. Symbol "T" represents a machine cycle.

An example of a program corresponding to FIGS. 12 and 13 is as follows:

JUMPV LABEL1+1: when F3'="1", jump to an area which is two addresses ahead

LABEL1:LOAD R0, [100]: transfer data from memory area "100" to register R0.

It is assumed that conditional transfer instruction JUMPV is stored in the n-th address area of the instruction memory and data transfer instruction LOAD is stored in the (n+1)th address area.

The program checks in the first line whether an overflow occurs. If it does occur, the microcomputer jumps to the processing described in the address area which is two addresses ahead, namely, the area identified by "LABEL1+1". In accordance with the second line of the program, data is transferred from the address area "100" of the data memory 4 to the "zero"-ordered register R0 of the register file 5 by way of the data bus.

The timing chart shown in FIG. 12 represents the case where a branch condition is not satisfied.

At time T, the conditional branch instruction or instruction JUMPV described in the first line is read out from the n-th memory area of the instruction memory 2. The readout instruction is written in the instruction register IR.

At time 2T, the JUMPV instruction is executed. Since "F3'=0" is defined in the flag signal F' output from the flag register 8, the branch condition is not satisfied. Accordingly, the instruction decoder 3 does not perform the processing specified in the branch. In the meantime, a LOAD instruction is read out from the (n+1)th address area of the instruction memory 2 and written in the instruction register IR.

Subsequently, the transfer instruction described in the second line is executed at time 3T, and data X is read out from the address area "100" of the data memory 4 and sent to the data bus.

At time 4T, data X sent to the data bus is written in the register R0 of the register file 5.

The timing chart shown in FIG. 12 represents the case where a branch condition is not satisfied.

The timing chart shown in FIG. 13 represents the case where a branch condition is satisfied.

As in the case shown in FIG. 12, the conditional branch instruction or instruction JUMPV described in the first line is read out from the n-th memory area of the instruction memory 2 at time T. The readout instruction is written in the instruction register IR.

At time 2T, the JUMPV instruction is executed. Since "F3'=1" is defined in the flag signal F' output from the flag register 8, the branch condition is satisfied. Accordingly, the instruction decoder 3 performs the processing specified in the branch. In this case, therefore, data X in the address area "100" of the data memory 4 is not sent to the data bus.

Where the branch condition of the JUMPV instruction is satisfied, the instruction decoder 3 supplies control signal k to the instruction memory 2, so that a NOP instruction (no-operation instruction) is output instead of the LOAD instruction. Accordingly, what is stored in the instruction register IR is not the LOAD instruction but the NOP instruction. The NOP instruction is an instruction used for timing adjustment and does not start any kind of operation. Such NOP instructions are prepared in the instruction sets of many types of processors.

The reason for using the NOP instruction in the above process is that the time needed for both the access to the instruction memory 2 and the execution of an instruction by the instruction decoder 3 should be as short as possible. In practice, therefore, the transfer instruction LOAD stored in the (n+1)th address area is read out from the instruction memory 2 and supplied to the instruction register IR, when the instruction decoder 3 is still executing the conditional branch instruction JUMPV.

Simultaneous with the use of the NOP instruction, the instruction decoder 3 supplies control signal j to the program counter 1, thereby causing the program counter 1 to output an address corresponding to a branch. In the example shown in FIGS. 12 and 13, this address is represented by (n+2).

Subsequently, the instruction decoder 3 executes the NOP instruction at time 3T. In addition, the instruction (Qn+2) stored in the address area (n+2) of the instruction memory 2 is written in the instruction register IR.

As described above, the time needed for data transfer is inevitably long if that data transfer is executed in accordance with the result of an operation (the state of an operation flag signal).

BRIEF SUMMARY OF THE INVENTION

The present invention has been developed in an effort to solve the above problems, and is intended to enable conditional data transfer and unconditional data transfer to be executed in the same machine cycle, i.e., to execute data transfer in one machine cycle at all times even if that data transfer must be performed in accordance with the result of an operation.

To achieve this object, the present invention provides a processor comprising: instruction storage means for storing arithmetic procedures and data transfer procedures as instructions and permitting the instructions to be output; arithmetic operation means for executing an arithmetic operation and outputting a state signal in accordance with a result of the arithmetic operation; state storage means for storing the state signal output from the arithmetic operation means; state decode means, supplied with the state signal stored in the state storage means and an instruction output from the instruction storage means, for outputting a state determination result in accordance with the state signal and the instruction; and instruction decode means, supplied with the state determination result and an instruction output from the instruction storage means, for outputting a control signal to cause the instruction to become effective or ineffective in accordance with the state determination result when the instruction is a data transfer instruction. The state decode means may determine whether the state signal stored in the state storage means coincides with part of the instruction output from the instruction storage means. The state decode means may perform an EXCLUSIVE-OR operation with respect to bits of the state signal stored in the state storage means and bits of part of the instruction output from the instruction storage means. The state decode means may perform an AND operation with respect to bits of the state signal stored in the state storage means and bits of part of the instruction output from the instruction storage means. The state decode means may perform an OR operation with respect to bits of the state signal stored in the state storage means and bits of part of the instruction output from the instruction storage means.

To achieve the above-mentioned abject, the present invention also provides a processor comprising: instruction storage means for storing arithmetic procedures and data transfer procedures as instructions and permitting the instructions to be output; arithmetic operation means for executing an arithmetic operation and outputting a state signal in accordance with a result of the arithmetic operation; state storage means for storing the state signal output from the arithmetic operation means; state mask storage means for storing a bit pattern; state decode means, supplied with the state signal stored in the state storage means and bit pattern stored in the mask storage means, for outputting a state determination result in accordance with the state signal and the bit pattern; and instruction decode means, supplied with the state determination result and an instruction output from the instruction storage means, for outputting a control signal to cause the instruction to become effective or ineffective in accordance with the state determination result when the instruction is a data transfer instruction. The state decode means may determine whether the state signal stored in the state storage means coincides with the bit pattern stored in the state mask storage means. The state decode means may perform an EXCLUSIVE-OR operation with respect to bits of the state signal stored in the state storage means and bits of the bit pattern stored in the state mask storage means. The state decode means may perform an AND operation with respect to bits of the state signal stored in the state storage means and bits of the bit pattern stored in the state mask storage means. The state decode means may perform an OR operation with respect to bits of the state signal stored in the state storage means and bits of the bit pattern stored in the state mask storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
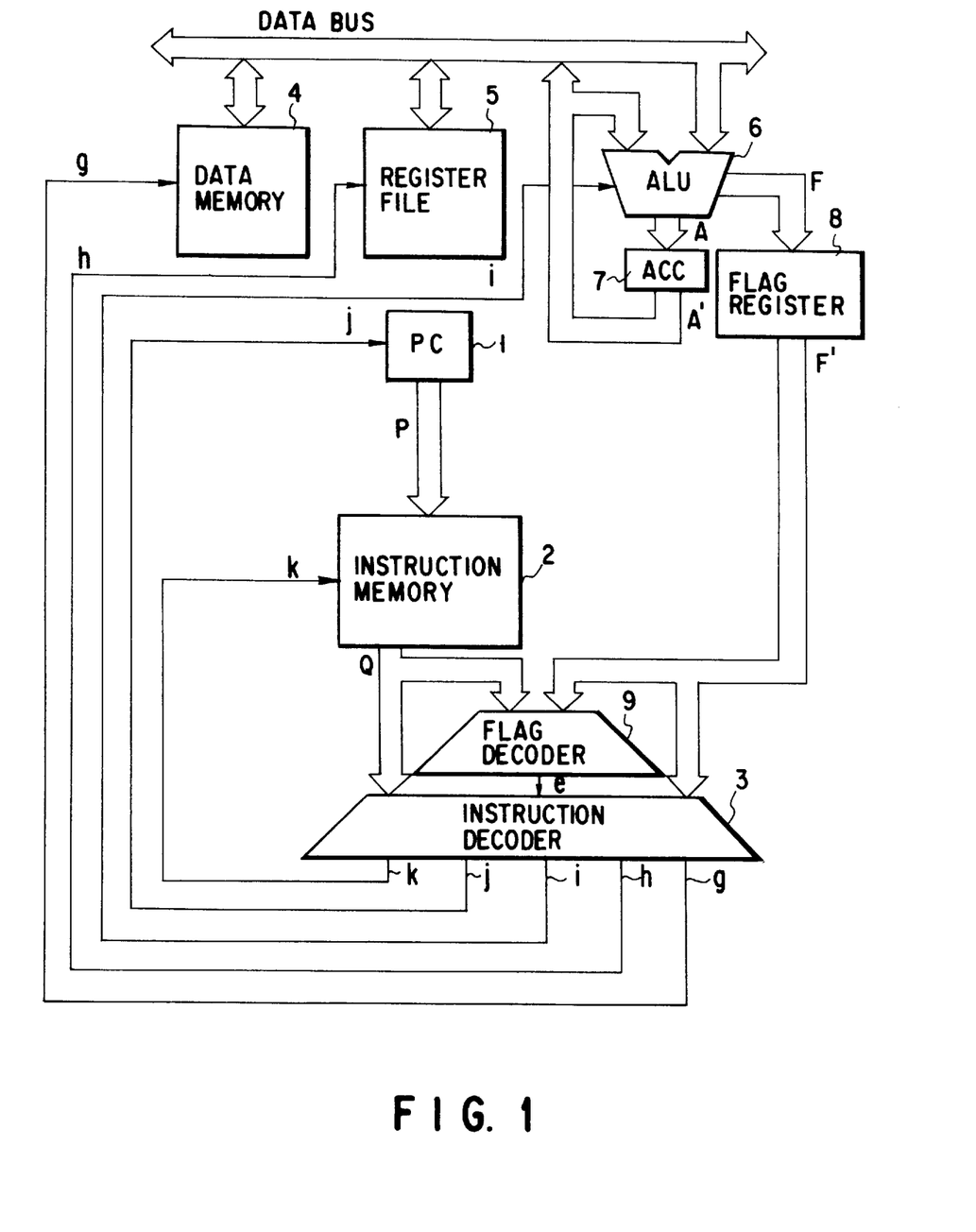
FIG. 1 shows a microprocessor according to the first embodiment of the present invention.

FIG. 1 shows a microprocessor according to the first embodiment of the present invention. Throughout the Figures, the same reference numerals and symbols are used to denote corresponding structural elements, and a redundant explanation will be omitted.

Referring to FIG. 1, the microprocessor comprises a program counter PC1, an instruction memory 2, an instruction decoder 3, a data memory 4, a register file 5, an operation circuit (ALU) 6, an accumulator (ACC) 7, a flag register 8 and a flag decoder 9.

The program counter 1 outputs an address signal P.

This address signal P is supplied to the address signal input terminal of the instruction memory 2. In response to this, an instruction Q stored at the address area corresponding to the address signal P is read out from the instruction memory 2 and is written in an instruction register IR (not shown).

The instruction Q stored in the instruction register IR is supplied to the instruction input terminal of the instruction decoder 3. Upon receipt of the instruction Q, the instruction decoder 3 analyzes it and generates signals corresponding thereto. To be more specific, control signals g, h, i, j and k are generated, and supplied to the data memory 4, register file 5, operation circuit 6, program counter 1 and instruction memory 2, respectively.

The data input/output terminals of the data memory 4, register file 5 and operation circuit 6 are connected to a data bus. By way of this data bus, data D is inter-transferred among the data memory 4, register file 5 and operation circuit 6.

Data A' stored in the accumulator 7 is supplied to the first input terminal of the operation circuit 6, and data D is supplied to the second input terminal of the operation circuit 6 by way of the data bus. Upon receipt of data A' from the accumulator 7 and data D, the operation circuit 6 executes an operation, such as a logic operation or an arithmetic operation. A result A of the operation is stored in the accumulator 7. The conditions generated during the operation, such as the overflow condition, the plus or minus state of the operation result, the "zero" state thereof, a carry output, are represented by respective 1-bit state signals referred to as flags. The operation circuit 6 arranges these flags in the form of one flag signal F and outputs this flag signal F.

The flag signal F is stored in the flag register 8. Output signal F' from the flag register 8 is supplied to the flag input terminal of the instruction decoder 3 as an operation flag signal F'. The instruction decoder 3 uses the operation flag signal F' for determining the branch conditions of a conditional branch instruction.

Instruction Q stored in the instruction register IR is supplied to the instruction input terminal of the flag decoder 9, and output signal F' of the flag register 8 is supplied to the flag input terminal of the flag decoder 9. In accordance with instruction Q and output signal F' of the flag register 8, the flag decoder 8 generates control signal e. This control signal e is supplied to the control terminal of the instruction decoder 3.

The instruction decoder 3 varies control signals g, h and i in accordance with control signal e, so as to make the data transfer instruction effective or ineffective. In this manner, data transfer is performed in accordance with the result of an operation, and this data transfer operation is not dependent on a conditional branch instruction.

Let us assume that a state is assigned to each of the bits F3', F2', F1' and F0' of a flag signal, as in the prior art described in the "Background of the Invention." In this case, a conditional transfer instruction, such as that indicated below, is prepared and included in a set of instructions of the processor.

LOADNV: execute data transfer when F3'="0", and cancel the instruction when F3'="1".

LOADNS: execute data transfer when F2'="0", and cancel the instruction when F2'="1".

LOADNZ: execute data transfer when F1'="0", and cancel the instruction when F1'="1".

LOADNC: execute data transfer when F0'="0", and cancel the instruction when F0'="1".

Figure 7:
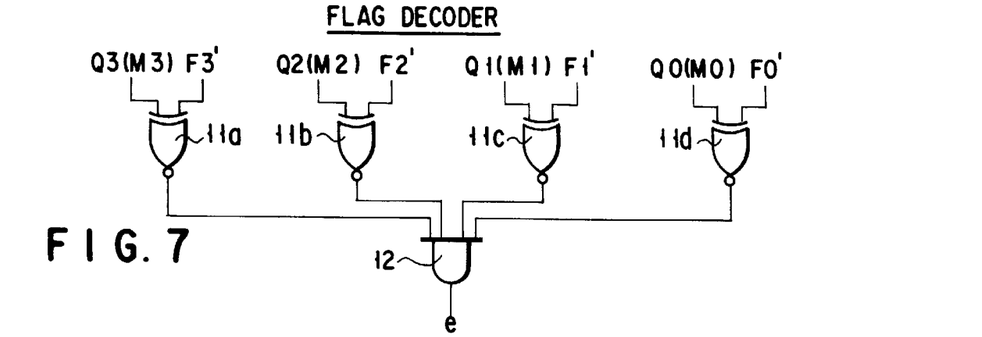
FIG. 7 shows a first example of a circuit configuration of a flag decoder.

FIG. 7 shows an example of a circuit configuration of the flag decoder 9 used in the embodiment shown in FIG. 1.

Referring to FIG. 7, the lower four bits Q3-Q0 of instruction Q are supplied to the first input terminals of exclusive-NOR gates 11a–11d, respectively. Flag signals F3', F2', F1' and F0' are supplied to the second input terminals of the exclusive-NOR gates 11a–11d, respectively. The output terminals of exclusive-NOR gates 11a–11d are connected to the first to fourth input terminals of an AND gate 12. From the output terminal of this AND gate, control signal e is output.

When the flag decoder shown in FIG. 7 is used, the lower four bits Q3-Q0 of instruction Q representing conditional transfer instruction LOADNV are determined as "0", "1", "1" and "1", respectively. If F3'="0" and F2' to F0' are "1" at the time of executing instruction LOADNV, then control signal e is "1", and data transfer is executed. If F3'="1" at the time, control signal e is "0", and data transfer is not executed.

Figure 2:
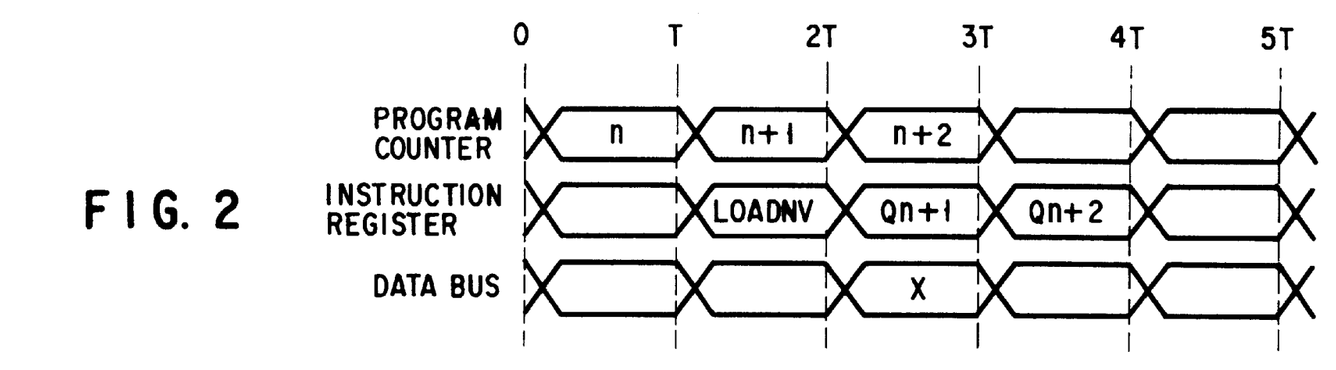
FIG. 2 is a timing chart of the microprocessor shown in FIG. 1.
Figure 3:
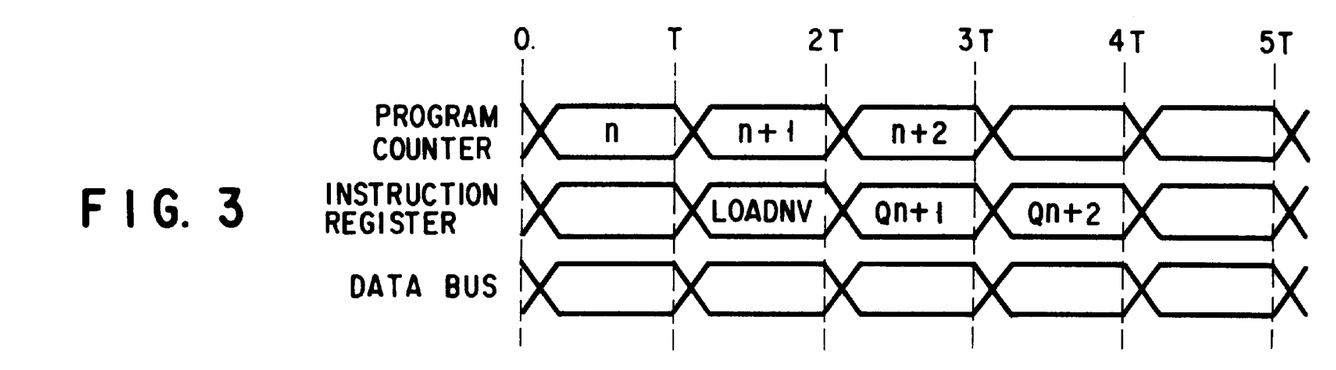
FIG. 3 is also a timing chart of the microprocessor shown in FIG. 1.

FIGS. 2 and 3 are timing charts showing the case where a conditional transfer instruction is executed in the embodiment shown in FIG. 1.

An example of a program corresponding to the timing charts shown in FIGS. 2 and 3 is set forth below.

LOADNV R0, [100]: transfer data from memory area "100" to register R0 when F3'="0". Do not perform any operation when F3'="1".

It is assumed that conditional transfer instruction LOADNV is stored in the n-th address area of the instruction memory 2.

First of all, the program checks whether an overflow occurs. If it does not occur, the microcomputer transfers data from the address area "100" of the data memory 4 to the "zero"-ordered register R0 of the register file 5 by way of the data bus. If the overflow does occur, the microprocessor does not transfer the data and performs the next instruction.

The timing chart shown in FIG. 2 represents the case where a transfer condition is satisfied.

The address signal P which is output from the program counter 1 at time T indicates an n-th address area. At time T, therefore, the conditional transfer instruction LOADNV is read out from the n-th address area of the instruction memory 2, and the readout instruction is written in the instruction register IR.

At time 2T, the LOADNV instruction which is stored in the instruction register IR at time 2T is executed.

First of all, an operation flag signal F' is supplied to the flag input terminal of the flag decoder 9 at time 2T. In the operation flag signal F', F3' is "0", and F2' to F0' are "1", for example. At the time, instruction LOADNV is supplied to the instruction input terminal of the flag decoder 9 from the instruction register IR. Since F3' is "0", the flag decoder 9 supplies control signal e of "1" to the instruction decoder 3. Control signal e is defined such that a transfer instruction is made effective when control signal e is "1" and is made ineffective when it is "0".

Since instruction LOADNV is a transfer instruction and control signal e indicates that the transfer instruction is effective, the instruction decoder 3 outputs control signals g, h and i that designates the execution of data transfer. Hence, data X stored in the address area "100" of the data memory 4 is sent to the data bus D.

At time 3T, data X sent to the data bus D is written in register R0. Simultaneously with this, instruction Qn+1 stored in the address area (n+1) of the instruction memory 2 is executed.

The timing chart shown in FIG. 3 represents the case where a transfer condition is not satisfied.

As in the case shown in FIG. 2, the address signal P which is output from the program counter 1 at time T indicates an n-th address area. At time T, therefore, the instruction LOADNV is read out from the n-th address area of the instruction memory 2, and the readout instruction is written in the instruction register IR.

At time 2T, the LOADNV instruction is executed. At the time, an operation flag signal F' that defines F3' as "1" is supplied to the flag input terminal of the flag decoder 9, and instruction LOADNV is supplied to the instruction input terminal of the flag decoder 9. Since F3' is "1", the flag decoder 9 supplies control signal e of "0" to the instruction decoder 3. In the "0" state, control signal e makes the transfer instruction ineffective.

Although instruction LOADNV is a transfer instruction, control signal e indicates that the transfer instruction is ineffective. Accordingly, the instruction decoder 3 does not output control signals g, h and i that designates the execution of data transfer.

At time 3T, instruction Qn+1 stored in the address area (n+1) of the instruction memory 2 is executed. Unlike the prior art shown in FIG. 13, the present embodiment does not execute a NOP instruction.

According to the above embodiment, a NOP instruction is not used without reference to the satisfaction of a transfer condition. Accordingly, high-speed processing is enabled. The processing time can be remarkably shortened, particularly when the conditional transfer operation is used in a loop.

Figure 4:
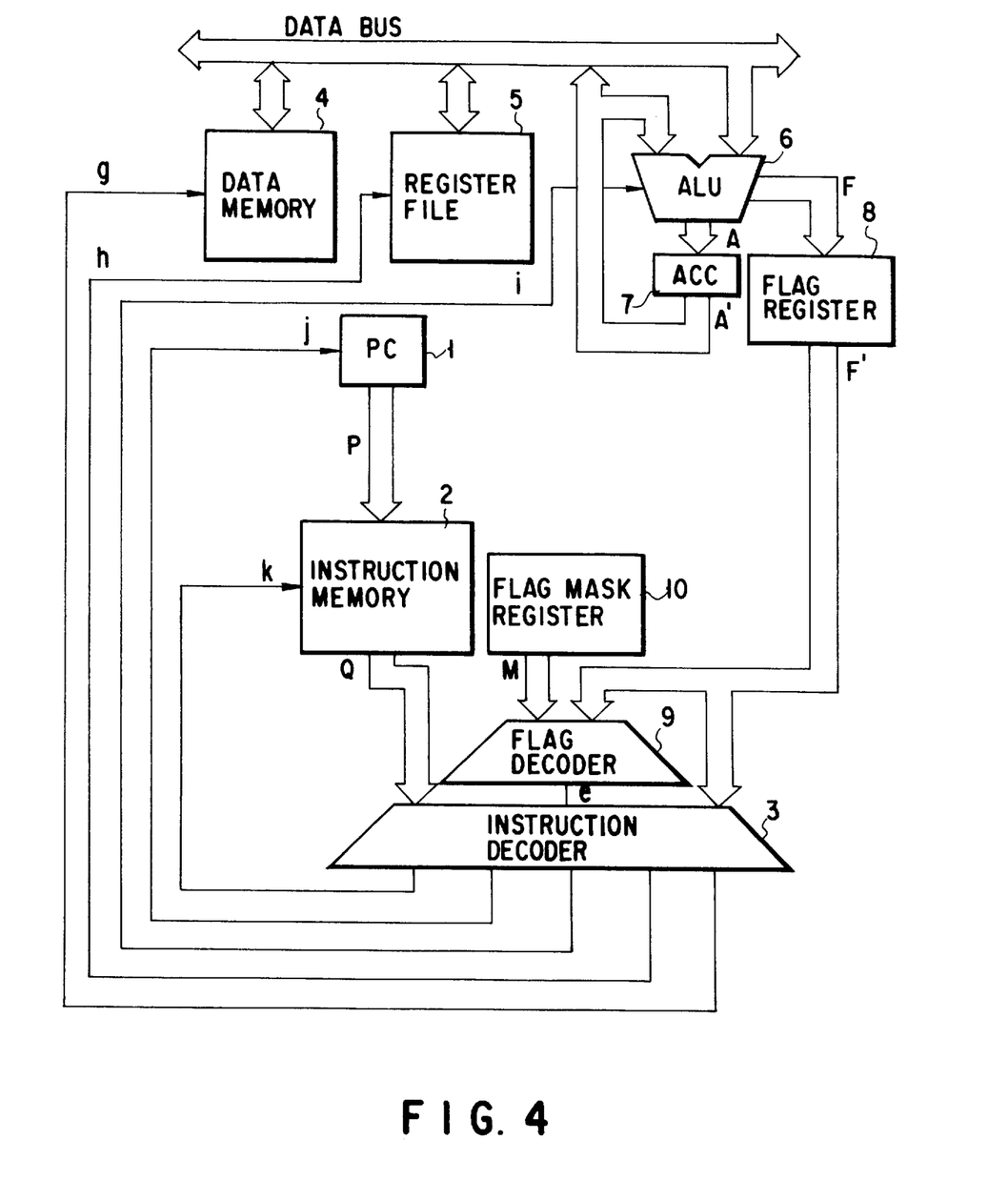
FIG. 4 shows a microprocessor according to the second embodiment of the present invention.

FIG. 4 shows a microprocessor according to the second embodiment of the present invention. The microprocessor shown in FIG. 4 differs from that shown in FIG. 1, in that a flag mask register 10 is additionally employed.

The flag mask register 10 holds mask data M. The flag mask register is provided inside the register file 5, for example, and the mask data therein is rewritable.

In the microprocessor shown in FIG. 4, an output signal of the flag mask register 10 is supplied to the instruction input terminal of the flag decoder 9 (an output signal Q of the instruction memory 2 is supplied thereto in the microprocessor shown in FIG. 1).

The flag decoder 9 has such a circuit configuration as shown in FIG. 7. Assuming that the bits of the mask data M of the flag mask register 10 are M3-M0, the flag decoder 9 employed in the second embodiment can be represented by the illustration in FIG. 7 if only "Q3" to "Q0" are replaced with "M3" to "M0", respectively.

The second embodiment requires only one kind of conditional transfer instruction. A state which is to be utilized as a transfer condition is determined by mask data M.

As this conditional transfer instruction, the following instruction is prepared:

CLOAD: execute data transfer if a predetermined condition is satisfied, and do not perform any operation if the predetermined condition is not satisfied. In the case where the flag decoder shown in FIG. 7 is employed as the flag decoder 9, whether the predetermined condition is satisfied or not can be expressed as follows:

If F'=M, the condition is satisfied.

If F'≠M, the condition is not satisfied.

Prior to the execution of the conditional transfer instruction, mask data M is prepared by executing ordinary (unconditional) transfer instruction. Accordingly, the mask data or pattern M can be set to be an arbitrary value.

Figure 5:
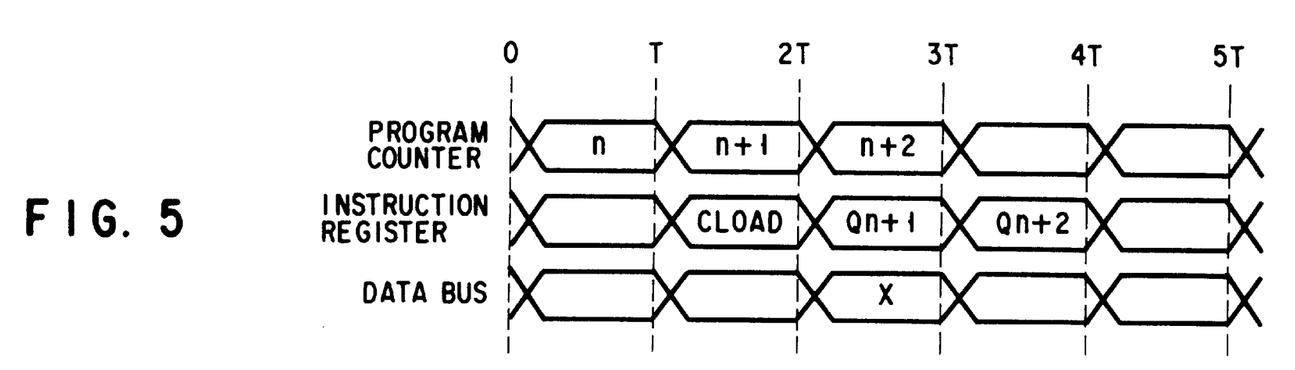
FIG. 5 is a timing chart of the microprocessor shown in FIG. 4.
Figure 6:
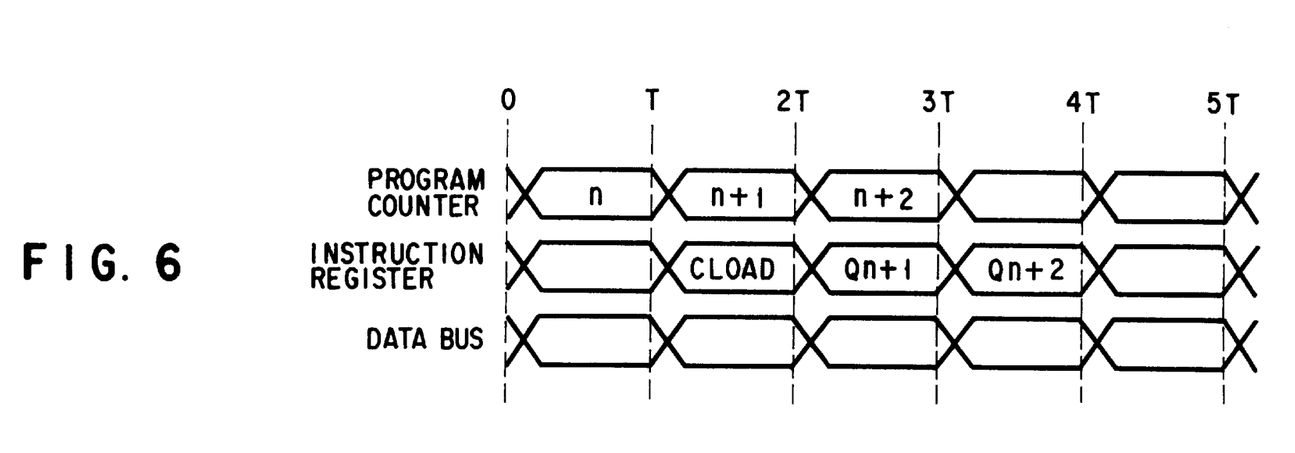
FIG. 6 is also a timing chart of the microprocessor shown in FIG. 4.

FIGS. 5 and 6 are timing charts corresponding to the microprocessor of the embodiment shown in FIG. 4.

A conditional transfer program corresponding to the timing charts shown in FIGS. 5 and 6 is set forth below.

CLOAD R0, [100]: transfer data from memory area "100" to register R0 when F'=M. Do not perform any operation when F'≠M.

This conditional transfer program is stored in the address area "n" of the instruction memory 2.

It is assumed that before the execution of the conditional transfer program, the mask pattern of a flag is determined by ordinary (unconditional) transfer instruction, as set forth below.

LOAD M, 0111: set value 0111 in the flag mask register.

The timing charts shown in FIGS. 5 and 6 are similar to those shown in FIGS. 2 and 3, except that the LOADNV instruction is replaced with the CLOAD instruction.

FIG. 5 is a timing chart corresponding to the case where a transfer condition is satisfied.

The address signal P which is output from the program counter 1 at time T indicates an n-th address area. At time T, therefore, the conditional transfer instruction CLOAD is read out from the n-th address area of the instruction memory 2, and the readout instruction is written in the instruction register IR.

At time 2T, the CLOAD instruction is executed.

First of all, an operation flag signal F' that defines F3' as "0" and defines F2' to F0' as "1" is supplied to the flag input terminal of the flag decoder 9 from the flag register 8 at time 2T. In addition, mask data M that defines M3 as "0" and defines M2 to M0 as "1" is supplied to the mask input terminal of the flag decoder 9. Since F' is M, control signal e of "1" is supplied to the instruction decoder 3. Control signal e makes the transfer instruction effective when in the "1" state, and makes the transfer instruction ineffective when in the "0" state.

Since instruction CLOAD is a transfer instruction and control signal e indicates effective state of the transfer instruction, the instruction decoder 3 outputs control signals g, h and i at time 2T. In response to the control signals, the transfer operation is started.

As a result of the output of the control signals, data X stored in the address area "100" of the data memory 4 is output to the data bus D.

At time 3T, the data X sent to the data bus D is written in the register R0. In addition, the instruction Qn+1 stored in the address area "n+1" of the instruction memory 2 is executed.

FIG. 6 is a timing chart corresponding to the case where a transfer condition is not satisfied.

As in the case shown in FIG. 5, the address signal P which is output from the program counter 1 at time T indicates an n-th address area. At time T, therefore, the conditional branch instruction CLOAD is read out from the n-th address area of the instruction memory 2, and the readout instruction is written in the instruction register IR.

At time 2T, the CLOAD instruction is executed. At the time, an operation flag signal F' that defines F3' to F0' as "1" is supplied to the flag input terminal of the flag decoder 9. In the meantime, mask data M that defines M3 as "0" and defines M2-M0 as "1" is supplied to the mask input terminal of the flag decoder 9. Since F'≠M, the flag decoder 9 supplies the instruction decoder 3 with control signal e that makes the data transfer invalid.

Although instruction CLOAD is a transfer instruction, control signal e indicates ineffective state of the transfer instruction. Therefore, the instruction decoder 3 does not output control signal g, h or i that causes the transfer operation to be started.

At time 3T, instruction Qn+1 stored in the address area (n+1) of the instruction memory 2 is executed. Unlike the prior art shown in FIG. 13, the present embodiment does not execute a NOP instruction.

According to the second embodiment shown in FIG. 4, a NOP instruction is not used, as in the first embodiment shown in FIG. 1. Accordingly, high-speed processing is enabled. Since the second embodiment requires only one kind of conditional transfer instruction, the number of instructions included in the instruction set can be as small as possible. In addition, the second embodiment enables the transfer conditions to be freely changed by modifying the programs.

Figure 8:
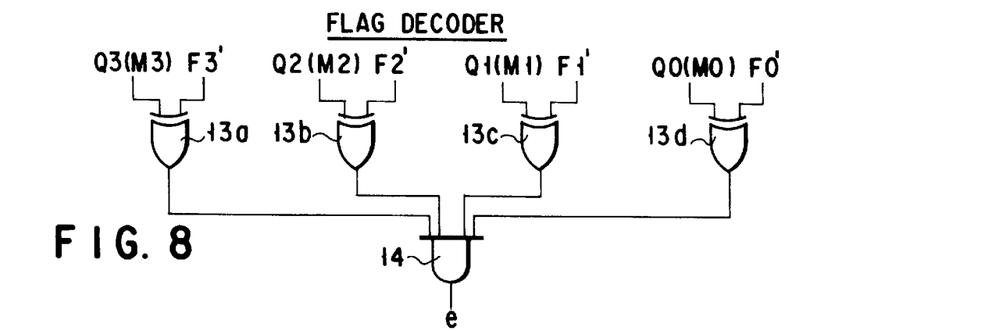
FIG. 8 shows a second example of a circuit configuration of the flag decoder.

FIG. 8 shows a second example of a circuit configuration of the flag decoder 9 used in the present invention.

When the flag decoder in FIG. 8 is applied to the embodiment shown in FIG. 1, the lower four bits Q3-Q0 of instruction Q are supplied to the first terminals of the exclusive-OR gates 13a–13d. When that flag decoder is applied to the embodiment shown in FIG. 4, bit signals X3-M0 of 4-bit mask data M are supplied to the first terminals of the exclusive-OR gates 13a–13d. Flag signals F3', F2', F1' and F0' are supplied to the second input terminals of the exclusive-OR gates 13a–13d. The output terminals of the exclusive-OR gates 13a–13d are connected to the first to fourth input terminals of the AND gate 14. Control signal e is produced from the output terminal of the AND gate 14.

Figure 9:
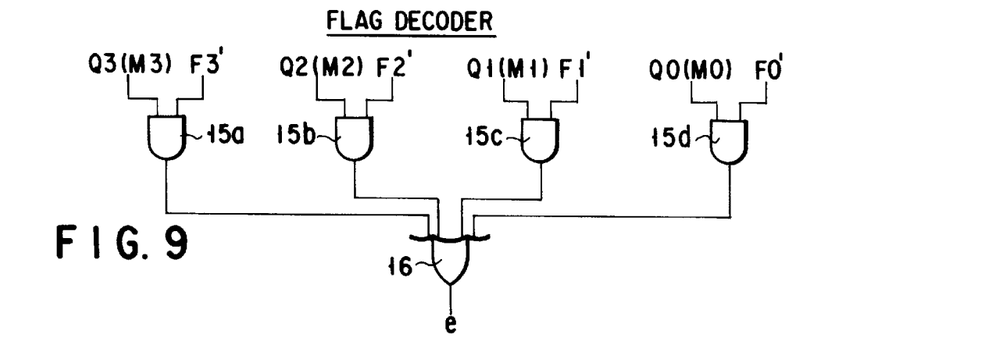
FIG. 9 shows a third example of a circuit configuration of the flag decoder.

FIG. 9 shows a third example of a circuit configuration of the flag decoder 9 used in the present invention.

When the flag decoder in FIG. 9 is applied to the embodiment shown in FIG. 1, bits signals Q3-Q0 are supplied to the first terminals of the AND gates 15a–15d. When that flag decoder is applied to the embodiment shown in FIG. 4, bit signals M3-M0 are supplied to the first terminals of the AND gates 15a–15d. Flag signals F3', F2', F1' and F0' are supplied to the second input terminals of the AND gates 15a–15d. The output terminals of the AND gates 15a–15d are connected to the first to fourth input terminals of the OR gate 16. Control signal e is produced from the output terminal of the OR gate 16.

Figure 10:
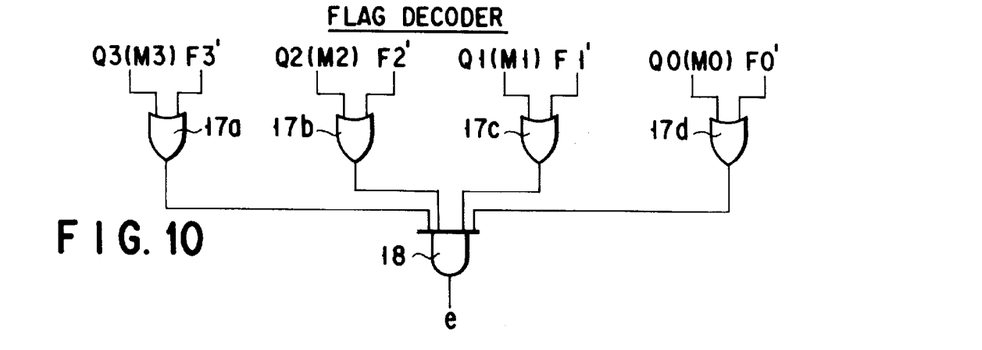
FIG. 10 shows a fourth example of a circuit configuration of the flag decoder.

FIG. 10 shows a fourth example of a circuit configuration of the flag decoder 9 used in the present invention.

When the flag decoder in FIG. 10 is applied to the embodiment shown in FIG. 1, bits signals Q3-Q0 are supplied to the first terminals of the OR gates 17a–17d. When that flag decoder is applied to the embodiment shown in FIG. 4, bit signals M3-M0 are supplied to the first terminals of the OR gates 17a–17d. Flag signals F3', F2', F1' and F0' are supplied to the second input terminals of the OR gates 17a–17d. The output terminals of the OR gates 17a–17d are connected to the first to fourth input terminals of the AND gate 18. Control signal e is produced from the output terminal of the AND gate 18.

Whether a data transfer instruction should be effective or ineffective can be controlled in various manners on the basis of an operation flag signal F and an instruction Q (or mask data M) by modifying the circuit configuration of the flag decoder 9, as shown in FIGS. 7 to 10.

As detailed above, the present invention executes data transfer in accordance with the result of an operation by using only a conditional transfer instruction. Since it is not necessary to use a NOP instruction, the processor is allowed to operate with high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A processor comprising:
   instruction storage means for storing instructions including a conditional transfer instruction for instructing a data transfer;
   arithmetic operation means for executing an arithmetic operation and outputting a state signal in accordance with a result of the arithmetic operation;

state storage means for storing the state signal output from the arithmetic operation means;

state decode means, supplied with the state signal stored in the state storage means and an instruction output from the instruction storage means, for outputting a state determination result in accordance with the state signal and the instruction; and instruction decode means, supplied with the state determination result and an instruction output from the instruction storage means, for controlling the conditional transfer instruction to cause the conditional transfer instruction to become effective or ineffective in accordance with the state determination result when the instruction is a conditional transfer instruction.

2. A processor according to claim 1, wherein said state decode means determines whether the state signal stored in the state storage means coincides with part of the instruction output from the instruction storage means.

3. A processor according to claim 1, wherein said state decode means performs an EXCLUSIVE-OR operation with respect to bits of the state signal stored in the state storage means and bits of part of the instruction output from the instruction storage means.

4. A processor according to claim 1, wherein said state decode means performs an AND operation with respect to bits of the state signal stored in the state storage means and bits of part of the instruction output from the instruction storage means.

5. A processor according to claim 1, wherein said state decode means performs an OR operation with respect to bits of the state signal stored in the state storage means and bits of part of the instruction output from the instruction storage means.

6. A processor comprising:

instruction storage means for storing instructions including a conditional transfer instruction for instructing a data transfer;

arithmetic operation means for executing an arithmetic operation and outputting a state signal in accordance with a result of the arithmetic operation;

state storage means for storing the state signal output from the arithmetic operation means;

state mask storage means for storing a bit pattern;

state decode means, supplied with the state signal stored in the state storage means and the bit pattern stored in the mask storage means, for outputting a state determination result in accordance with the state signal and the bit pattern; and instruction decode means, supplied with the state determination result and an instruction output from the instruction storage means, for controlling the conditional transfer instruction to cause the conditional transfer instruction to become effective or ineffective in accordance with the state determination result when the instruction is a conditional transfer instruction.

7. A processor according to claim 6, wherein said state decode means determines whether the state signal stored in the state storage means coincides with the bit pattern stored in the state mask storage means.

8. A processor according to claim 6, wherein said state decode means performs an EXCLUSIVE-OR operation with respect to bits of the state signal stored in the state storage means and bits of the bit pattern stored in the state mask storage means.

9. A processor according to claim 6, wherein said state decode means performs an AND operation with respect to bits of the state signal stored in the state storage means and bits of the bit pattern stored in the state mask storage means.

10. A processor according to claim 6, wherein said state decode means performs an OR operation with respect to bits of the state signal stored in the state storage means and bits of the bit pattern stored in the state mask storage means.

11. A processor comprising:

instruction storage means for storing arithmetic procedures and data transfer procedures as instructions and permitting the instructions to be output;

arithmetic operation means for executing an arithmetic operation and outputting a state signal in accordance with a result of the arithmetic operation, wherein the state signal indicates at least one of a zero condition, carry condition, overflow condition, or sign of the result of the arithmetic operation;

state storage means for storing the state signal output from the arithmetic operation means;

state decode means, supplied with the state signal stored in the state storage means, for outputting a state determination result; and instruction decode means, supplied with the state determination result and an instruction output from the instruction storage means, for outputting a control signal to cause the instruction to become effective or ineffective in accordance with the state determination result when the instruction is a conditional instruction.

12. The processor of claim 11, wherein the state decode means is further supplied with at least a portion of the instruction output from the instruction storage means, and the state determination result is generated by comparing the portion of the instruction output from the instruction storage means with the state signal stored in the state storage means.

13. The processor of claim 11, further comprising a state mask storage means for storing a bit pattern, wherein the state decode means is further supplied with the bit pattern, and the state determination result is generated by comparing the bit pattern with the state signal stored in the state storage means.

* * * * *